Oct. 28, 1969   J. G. RUPERT   3,474,670
PURE FLUID CONTROL APPARATUS
Filed June 28, 1965   3 Sheets-Sheet 1
FIG. I
PRIOR ART
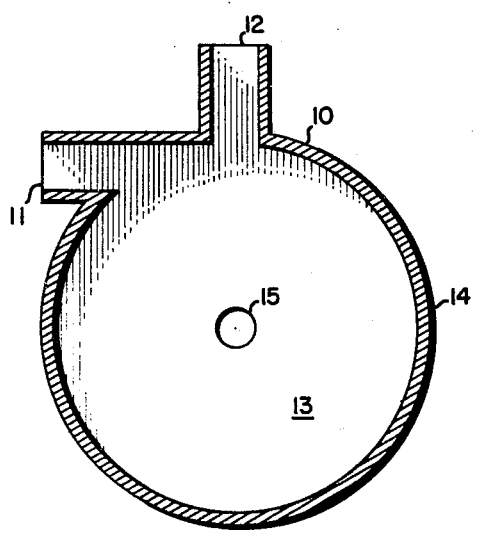
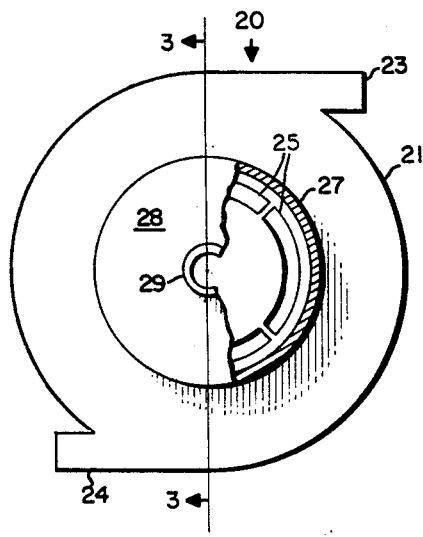
FIG. 2
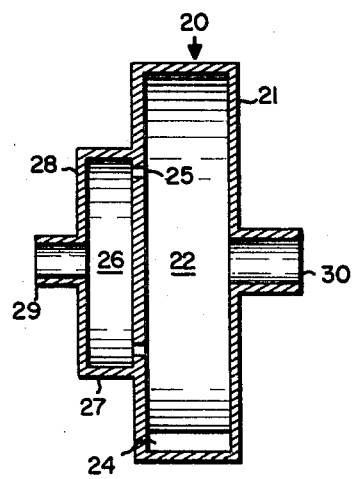
FIG. 3
INVENTOR.
JOHN G. RUPERT
BY
ATTORNEY Oct. 28, 1969     J. G. RUPERT     3,474,670
PURE FLUID CONTROL APPARATUS
Filed June 28, 1965     3 Sheets-Sheet 2
FIG. 4
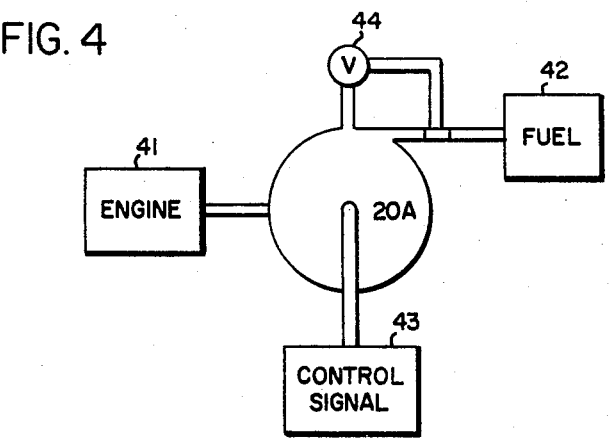
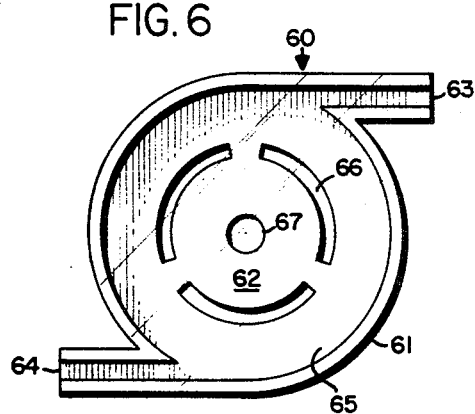
FIG. 6
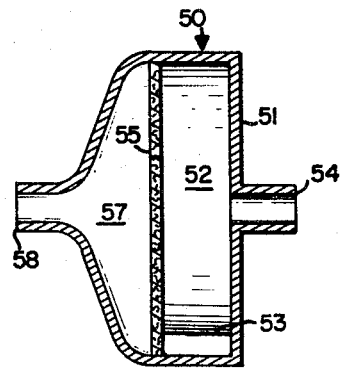
FIG. 5
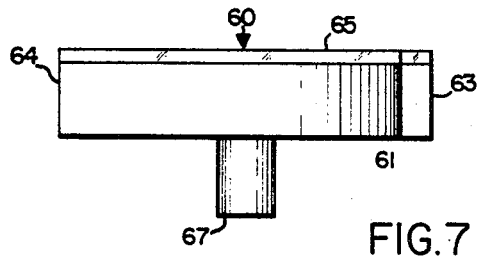
FIG. 7
INVENTOR.
JOHN C. RUPERT
BY *George W. Field*
ATTORNEY Oct. 28, 1969

J. G. RUPERT 3,474,670

PURE FLUID CONTROL APPARATUS

Filed June 28, 1965

INVENTOR.
JOHN C. RUPERT
BY
ATTORNEY

United States Patent Office 3,474,670
Patented Oct. 28, 1969

3,474,670
PURE FLUID CONTROL APPARATUS
John G. Rupert, St. Anthony Village, Minn., assignor to Honeywell Inc., Minneapolis, Minn., a corporation of Delaware
Filed June 28, 1965, Ser. No. 467,382
Int. Cl. G01f 1/00; F15c 1/14
U.S. Cl. 73—194                                    8 Claims

ABSTRACT OF THE DISCLOSURE

A vortex device having a chamber with a tangential inlet for introducing a fluid and an annular outlet for discharging the fluid from the chamber in accordance with an input signal supplied to said chamber.

---

Figure 8:
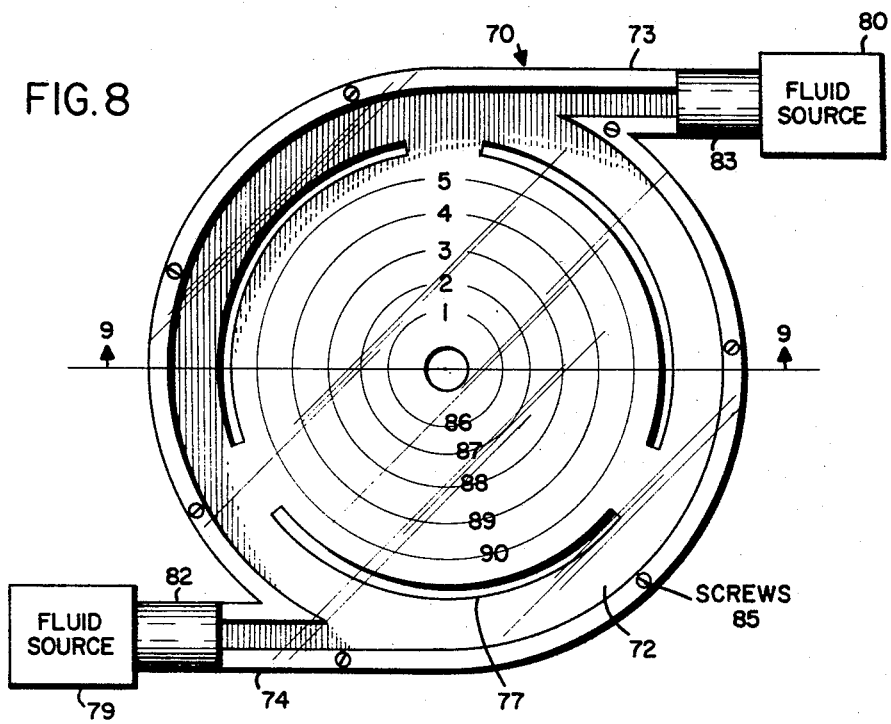

This invention relates to fluid amplifiers and, more specifically, to apparatus for monitoring and metering fluids.

The discovery of fluid amplifiers of a non-vortex type has led to much activity and demand for the use of fluid devices to perform monitoring, metering, control, and sensing functions. These non-vortex type fluid amplifiers are capable of switching a fluid flow between two fluid flow passages by means of fluid jets directed at the side of the flowing fluid. The functions of monitoring, metering, control and sensing have conventionally been accomplished with various devices that employ moving parts or electrical components. However, with the advent of the new fluid amplifier technology much effort has been expended to replace conventional devices with fluid amplifier devices, the primary reason being that moving parts are subject to wear and consequently failure. Fluid devices using no moving parts have been commonly referred to in the literature as "Pure Fluid Devices" and hereinafter will be referred to as such. An additional advantage of employing pure fluid devices is the inherent simplicity of construction, that results in a lower cost to make the device.

The pure fluid devices as used for basic sensing, metering, and monitoring functions in the fluid amplifier art have employed only a single fluid, and have not been able to control a liquid flow by a pneumatic flow effectively. As a result, hybrid devices, which have moving parts, have been employed when a gaseous jet is used to control a liquid flow. It can be appreciated that this is inconsistent with the philosophy of pure fluid devices, and Fluid amplifiers employing the principle of vortex motion are known and it is herein desired to employ the principles of vortex motion to perform fluid control and fluid metering functions.

An article describing the principle of fluid vortex flow appears in the publication Journal of Applied Physics, volume 28, No. 1, 86–92, January 1957. The article is entitled "Flow in a Viscous Vortex." This type of vortex fluid flow is governed by the principle of conservation of angular momentum. Generally speaking, in vortex flows, there are two components of fluid velocity: a tangential component of fluid velocity, which establishes the vortex motion, and a radial component of velocity, that causes the fluid to flow radially inward and to exhaust out an exit.

In order to solve the problem of unreliability with moving parts, the applicant has invented a pure fluid device for controlling fluid of two different states. Applicant in addition has provided an improved apparatus for measuring pressure, flow rate, and temperautre of a fluid.

Other uses of applicant's device will become apparent as the description proceeds and in the drawings, in which:

FIGURE 1 is a cross-sectional view of a prior art vortex valve;

FIGURE 2 shows a fluid metering valve;
FIGURE 3 is a cross-sectional view of applicant's fluid metering valve taken along line 3—3 of FIGURE 2;
FIGURE 4 is a schematic of a fluid metering valve in a control system;
FIGURE 5 is an alternate embodiment of FIGURE 2;
FIGURES 6 and 7 disclose a fluid vaporizing device; and
FIGURES 8 and 9 disclose apparatus for measuring fluid flow rate and fluid pressures.

Referring to FIGURE 1, reference numeral 10 generally identifies a prior art vortex fluid amplifier. The fluid signal and power fluid to amplifier 10 are supplied through passages 11 and 12 respectively to a cylindrical chamber 13 within housing means 14. A central passage 15 is provided to exhaust fluid from chamber 13. The fluid supplied through passage 11 creates a vortex or spiral motion of the fluid within chamber 13. The power fluid is supplied through passage 12. Amplifier 10 thus functions as a vortex valve. That is, more fluid flows through the device if there is a small amount of vortex motion present, and less fluid flows through the device with a large vortex present. It will be appreciated that this prior art device functions as a fluid amplifier by increasing or decreasing the strength of the vortex flow from chamber 13, which correspondingly decreases or increases the amount of fluid flowing from exit passage 15.

Referring to FIGURES 2 and 3, reference numeral 20 generally identifies applicant's fluid metering valve. A housing 21 is provided having a cylindrical vortex chamber 22 therein. The vortex chamber 22 has fluid supply ports 23 and 24 for a first fluid and an annular orifice 25 is provided in housing 21 for discharging the first fluid into a plenum chamber 26 composed of a tubular housing member 27 that is attached to housing 21, and a flat circular member 28 with a fluid exit member 29 therein.

Housing 21 has an input port 30 for admitting a second fluid to vortex chamber 22. It will be appreciated that no exit means is needed for the second fluid entering input port 30, because the second fluid does not flow through the device, but merely acts as a pressure reference.

The operation of the fluid metering valve shown in FIGURES 2 and 3 will be described with the first fluid being a liquid and the second fluid being air. It will be apparent that any fluids which are of different density and immiscible with each other could be used.

In normal operation the liquid enters supply ports 23 and 24 tangential to cylindrical chamber 22. The centrifugal force on the liquid as it spirals toward the annular exit 25 establishes a vortex flow or liquid ring in the outer annular portion of chamber 22. The centrifugal force establishing the liquid annulus is responsible for the success of the well-known experiment, that causes a pail of water not to spill when swung in a vertical circular arc.

For control of the liquid flow in normal operation a fluid signal in the form of air pressure is introduced into chamber 22 by supply passage 30. The result of the two fluids being introduced in the afore described manner is to establish an annular liquid ring in the peripheral portion of a chamber 22 having an inner gaseous core.

If the fluids are immiscible and of different densities a stable cylindrical interface is established between the air and the liquid in chamber 22.

A pneumatic signal is converted to a liquid signal in vortex chamber 22 due to the change in resistance to liquid flow caused by variations in air pressure in the core. That is, with a low signal pressure in the air core, the radius of the two fluid interface is small and the chamber is almost completely filled with liquid, resulting in less liquid flow through the chamber since energy must be spent spinning up the heavier fluid. Conversely, with a signal pressure in the core, the interface diameter increases and the liquid occupies only a small annular portion of the chamber, resulting in more liquid flow through the device, because the energy available is now not dissipated in spinning up such a large quantity of fluid. It can be appreciated that the centrifugal forces in the liquid annulus can be made much greater than gravity forces, so that the apparatus is relatively insensitive to mounting positions. Also, the device functions equally well in a zero gravity field, thus being well adapted for space use.

FIGURE 4 is a schematic diagram in a control system including a vortex valve and showing that the applicant's invention is applicable to vortex valves having radial inputs. A fluid metering valve 20A is shown, which receives fluid from fuel supply tank 42, and subsequently delivers fuel to engine 41, as a result of signals generated by control means 43. A valve 44 is shown to indicate that the amount of spinning fluid in fluid metering valve 20A can be varied mechanically. That is, a predetermined amount of swirl can be introduced in valve 20A by adjusting valve 44. For example, if a large amount of swirl is desired in valve 20A, the valve 44 should be completely closed off. Conversely, if a small amount of swirl is desired in valve 20A, valve 44 should be left open. The energy available from the tangential control port is then used to start the fluid issuing from radial control port into rotation. If fluid is introduced radially some of the energy must be used to spin up the fluid and the amount of swirl within the vortex chamber will be decreased.

The amount of liquid fuel supplied to engine 41 can be readily controlled with a pneumatic signal from control means 43 without the use of any moving parts. It can be appreciated that applicant has thus provided a device for using a pneumatic control signal to directly control fuel flow from system to a liquid fuel supply.

Referring now to FIGURE 5, reference numeral 50 generally depicts an alternate embodiment for interfacing two fluids. Reference numeral 51 denotes housing means having a substantially cylindrical or vortex chamber 52 therein. A first fluid is supplied to vortex chamber 52 through supply port 53, and a second fluid is supplied to vortex chamber 52 through supply port 54. Exit means 55, consisting of a permeable material such as sintered metal, serves as an exhaust means for the first and second fluids. A housing 51 is provided with a plenum chamber 57 for receiving the fluid as it exhausts from vortex chamber 52, and an exit passage 58 is located in housing means 51 to exhaust the fluid from plenum chamber 57.

In the absence of a fluid signal at supply port 54, the liquid fluid supplied at input 53, circulates around the vortex chamber 52 and flows out through permeable member 55; but when a fluid signal is supplied at input port 54 the liquid supplied from port 53 circulates in only an annular outer portion of the vortex chamber 52.

The amount of liquid being discharged through permeable member 55 is directly proportional to the area of the permeable member in contact with the liquid. Hence, liquid flow rate through exhaust member 58 increases as the liquid fills the vortex chamber 52, and conversely decreases as the liquid occupies a smaller portion of the vortex chamber 52. Thus, it can be appreciated that exit 25 of FIGURES 2 and 3 is replaced by permeable disc 55 as shown in FIGURE 5. The embodiment shown in FIGURE 5 results in mixing of the two fluids in plenum chamber 57; however, they can be readily separated if desired by running the mixed fluids through a centrifugal separator.

Referring to FIGURES 6 and 7, reference numeral 60 generally designates applicant's fluid amplifier. A cylindrical housing member 61 is shown with a vortex chamber 62 therein. Fluid is supplied to vortex chamber 62 through supply ports 63 and 64. An exit annulus 66 and passage means 67 are in communication with vortex chamber 62. A transparent end plate 65 has been provided for cylindrical housing member 62; however, it is not necessary to the invention that the end plate 65 be a transparent material. The end plate 65 can be attached to housing member 61 by screws or other suitable fastening means.

The structure of the embodiment shown in FIGURES 6 and 7 is similar to the structure shown in FIGURES 2 and 3. However, a single fluid is used in fluid amplifier 60 as opposed to two fluids being supplied to amplifier 20 and, in addition, fluid amplifier 60 functions as an absolute pressure reference, or a temperature sensor.

In normal operation fluid is supplied to vortex chamber 62 through fluid supply ports 63 and 64. Because the fluid supply ports are located tangentially to cylindrical vortex chamber 62 a strong spiral flow pattern is established in chamber 62. Thus, as the fluid particles follow a spiral path inward, their tangential velocity increases, similarly to a ball on a string wrapping around a post, or stated in terms familiar to those skilled in the art "angular momentum is conserved."

Bernoulli's classic equation of fluid dynamics teaches that the velocity of a fluid particle is proportional to the pressure associated with the flow of fluid, i.e. the faster a given fluid is traveling, the lower its pressure associated with it will be, and conversely, the slower its velocity, the greater the fluid pressure. When the fluid is not flowing the pressure associated with the fluid is commonly referred to as "stagnation pressure" meaning that the fluid is stagnant. At the other extreme, with a fast fluid velocity, the fluid pressure decreases to the "vaporization pressure" of the liquid. That is, the liquid has a minimum pressure associated with it at which the liquid boils and forms a vapor. The pressure associated with the change in phase from liquid to vapor is referred to by those skilled in the art as vaporization pressure. The process of changing from liquid to the vapor in the manner heretofore described is referred to by those skilled in the art as cavitation.

In certain instances cavitation is undesirable, such as in pump impellers, and ship propellers, because the cavitation bubbles created suddenly collapse when flowing into a higher pressure region. The collapse of the cavitation bubbles cause a very high pressure upon any adjacent solid wall, which if repeated often enough causes erosion damage to the solid wall. However, applicant is not concerned with this particular facet since his cavitation bubble formed is in stable equilibrium.

In normal operation of applicant's invention fluid spirals inward from supply ports 63 and 64 toward exit passages 66 and 67. To satisfy the equation of conservation of angular momentum, the fluid particles increase in tangential velocity as they spiral inward, while the pressure of the fluid decreases. Now, if the fluid supply pressure is sufficiently high, the fluid particles accelerate until they reach a state where the pressure associated with the fluid particles is equal to the vapor pressure of the fluid. When the liquid pressure associated with the fluid velocity becomes equal to the vapor pressure of the liquid, the liquid boils away leaving only the vapor phase. Consequently, in the outer annular portion of chamber 62 where the slower fluid particles are, a liquid annulus will be formed, with the core in the center of the liquid annulus being vaporized liquid. Once the simultaneous existance of liquid and vapor phase is established in the vortex chamber 62, the exit annulus 66 exhausts the liquid, and exit passage 67 exhausts the vaporized liquid.

Since the vapor pressure of the liquid is dependent upon the temperature of the liquid, it will be appreciated that a source of vaporized fluid has now been created which may serve as an absolute reference pressure if the liquid temperature is known; or that by monitoring the vapor pressure in the core of the vortex chamber the temperature of the liquid can be obtained. Thus, applicant's invention can be used as an absolute pressure reference, a liquid temperature sensor and a pure fluid metering valve.

Figure 9:
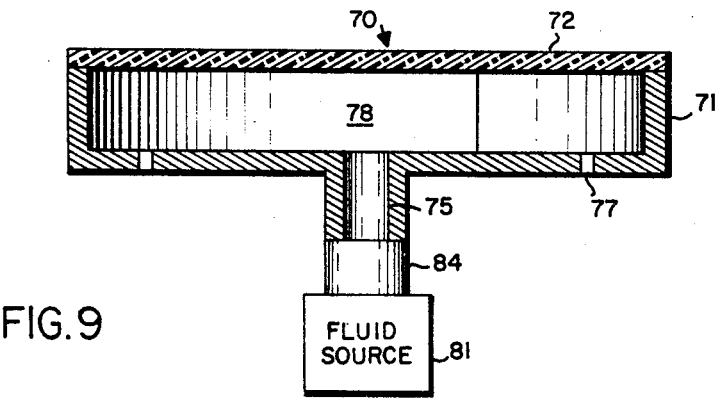

Referring to FIGURES 8 and 9, reference numeral 70 generally designates applicant's fluid amplifier as a fluid flow meter, or a liquid pressure manometer, or a gas pressure manometer. A cylindrical housing member 71 is shown having an end plate 72 of transparent material, fluid supply ports 73 and 74, a central fluid entrance passage 75, and an exit annulus 77 for discharging fluid. Fluid is supplied to vortex chamber 78 from fluid sources 79, 80, and 81 through fluid conduits 82, 83, and 84 respectively.

Located on end plate 72, which is fastened to housing member 71 by screws 85, is a series of concentrically scribed circles, denoted by reference numerals 86 through 90. These concentric circles need not be scribed on end plate 72, but may be put on in any manner whatsoever to indicate visually reference marks.

Applicant's invention will now be described with respect to operation as a fluid flow meter. The equation of fluid flow for the embodiment shown in FIGURES 8 and 9 is $$P_i - P_s = \rho \frac{\left(\frac{Q^2 R_o^2}{A_o^2 R_e^2}\right)}{R_e} \left[\frac{R_i^2 - 2R_e^2}{2R_e}\right]$$

where $P_i$ indicates the pressure of the fluid at central passage 75, $P_s$ indicates the pressure of the fluid at supply ports 73 and 74, $\rho$ indicates the density of the fluid being supplied from fluid supply ports 73 and 74, Q equals the volume flow rate of fluid from fluid supply ports 73 and 74, $A_o$ equals the entrance area of fluid supply ports 73 and 74, $R_o$ equals the radius of cylindrical chamber 78, $R_e$ equals the radius of the exit annulus 77, and $R_i$ is equal to the radius of a cylindrical interface between two fluids in vortex chamber 78. It will be noted that there are four dependent variables, namely $P_i$ the pressure at the cylindrical fluid interface, $P_s$ the pressure at the fluid supply ports 73 and 74, Q the volume flow rate of fluid entering through supply ports 73 and 74, and $R_i$, the radius of the cylindrical interface in vortex chamber 78. By dependent variables it is meant that the value of one variable has an effect on another variable. That is, if one is varied the other variable is affected. The relationship between these four variables makes it possible to use the fluid amplifier 70 as a manometer or flow meter. It will be noted that applicant's equation of motion for fluid flow is analogous to the conventional manometer equation $P_1 - P_2 = \rho G H$ where $P_1 - P_2$ is equal to a pressure difference, $\rho$ is equal to the density of the fluid, G is the gravitational constant and H is the height of the fluid column or pressure head. However, in applicant's fluid amplifier, a centrifugal acceleration related to the flow rate replaces the constant gravitational acceleration G in a conventional manometer. The H term or pressure head term is equivalent to the last bracketed expression:

$$\left[\frac{R_i^2 - 2R_e^2}{2R_e}\right]$$

In order to measure fluid flow rates, prior art flow meters have generally employed moving parts or have had separate instruments for readout. Applicant's invention in contrast has no moving parts, and additionally has a visual readout incorporated in the flow meter. The visual monitoring of fluid flow rate in applicant's invention is dependent upon the diameter of a bubble or cylindrical interface between two fluids. That is, an increase in bubble diameter indicates that less fluid is flowing through the device and a decrease in bubble diameter indicates that more fluid is flowing through the device. Since the amount of fluid flowing through the flow meter is dependent upon the diameter of a bubble in the center of a fluid vortex, applicant's invention may be appropriately entitled a vortex flowmeter.

In normal operation of vortex flow meter 70, a first fluid to be monitored is supplied at supply ports 73 and 74 which for purposes of illustration will be a liquid. A second source of constant pressure 81 is supplied to central passage 75, which for illustration purposes will be air. The secondary fluid or air is used only to establish a constant pressure air bubble in the center of the vortex chamber 78. Since there is no exit for the air within the chamber the air need not be continuously supplied to the air bubble however, it can be appreciated that air could be contantly supplied as long as the pressure of the air bubble remains constant. In order to measure the liquid flow rate of the fluid going in supply ports 73 and 74 and discharging from annular exit 77, it is necessary to have a means for determining the air bubble diameter in the vortex flow meter. Applicant has shown one particular means in FIGURE 8, which consists of calibrated circles on the end face plate 72. If the concentric circles are calibrated in fluid flow rate, a visual comparison of the air bubble diameter with the calibrated concentric circles gives one an indication of the volume flow rate of liquid through the vortex flow meter.

It is apparent that other means may be used to determine the bubble diameter in the vortex flow meter, such as an optical, mechanical or electrical readout means, and applicant does not want to be limited to the particular embodiment shown in FIGURE 8. Similarly, it is apparent that the number of supply ports is not critical to the performance of the vortex flow meter.

It will be recalled that applicant's analysis of the fluid flow in his fluid amplifier revealed four interdependent variables, namely: $P_i$ the pressure at the interface of the two fluids, $P_s$ the supply pressure at peripheral supply ports, Q the amount of fluid flowing into the peripheral supply ports, and $R_i$ the radius of the cylindrical bubble. The operation of the fluid amplifier as a vortex flow meter with a visual readout has heretofore been described by maintaining the peripheral supply pressure constant and the pressure in the core of the vortex chamber constant also.

Now, if the gas pressure at the center of the chamber is held constant and a constant liquid back pressure is maintained at annular exit 77, applicant's fluid amplifier functions as a liquid pressure gauge. That is, any change in liquid supply pressure at ports 73 and 74 is now reflected in a corresponding change in the bubble diameter, which may be visually determined in the same manner as described for the vortex flow meter. Thus the device functions as a vortex liquid pressure gauge.

Similarly if the pressure of the gas in the bubble is to be measured with applicant's fluid amplifier, it would require a constant liquid flow rate and a constant liquid supply pressure at ports 73 and 74. That is, an increase in the pressure in the core of vortex chamber 78 is reflected by an increase in the bubble diameter. Readout is accomplished in the same manner as for the vortex flow meter and for the vortex liquid pressure gauge. Thus, the device functions as a vortex gas pressure gauge.

I claim:
1. Apparatus of the class described comprising:
   a housing enclosing a substantially cylindrical chamber having an axis of symmetry;
   means for introducing a first fluid into the chamber so as to cause rotary motion of the fluid about the axis of symmetry, thereby establishing an annulus of the first fluid in the outer portion of the chamber;
   outlet means for discharging fluid from the chamber at a location spaced from the axis of symmetry;
   means for introducing a second fluid into the chamber along the axis of symmetry so as to occupy the portion of the chamber at a smaller radius than the inner radius of the annulus of first fluid; and
   means for determining the radius of the interface between the first and second fluids.
2. Apparatus of the class described comprising:
   a housing enclosing a substantially cylindrical chamber having an axis of symmetry;
   means for introducing a first fluid into the chamber so as to cause rotary motion of the fluid about the axis of symmetry, thereby establishing an annulus of the first fluid in the outer portion of the chamber, said first fluid having a parameter associated therewith;

means for introducing a second fluid into the chamber along the axis of symmetry so as to occupy the portion of the chamber at a smaller radius than the inner radius of the annulus of first fluid, said second fluid having a parameter associated therewith, the radius of the interface between the first and second fluids being dependent on the parameters associated with first and second fluids;

outlet means for discharging fluid from the chamber at a location spaced from the axis of symmetry; and means for determining the radius of the interface between the first and second fluids, thereby determining the relationship between the parameters associated with the first and second fluids.

3. A fluid flowmeter comprising:

a substantially cylindrical chamber having a central axis;

transparent material forming an end face of said chamber, a series of concentric circles located on said end face coaxial with said chamber, said concentric circles being calibrated in fluid flow rate, input means for supplying a first fluid rotationally to said chamber whereby said first fluid occupies an annular portion of said chamber, annular exit means for discharging said first fluid from said chamber; and central passage means for supplying to said chamber a second fluid at a constant pressure so as to create a visual fluid interface.

4. A fluid flowmeter comprising:

a substantially cylindrical chamber having a central axis;

transparent material forming an end face of said chamber, input means for supplying a first fluid rotationally to said chamber whereby said first fluid occupies an annular portion of said chamber, annular exit means for discharging said first fluid from said chamber; and central passage means for supplying to said chamber a second fluid at a constant pressure so as to create a visual fluid interface.

5. A fluid pressure gauge comprising:

a substantially cylindrical chamber having a central axis;

transparent material forming an end face of said chamber, input means for supplying a first fluid rotationally at a constant flow rate and pressure to said chamber whereby said first fluid occupies an annular portion of said chamber, annular exit means for discharging said first fluid from said chamber; and central pasage means for supplying to said chamber a second fluid whose pressure is to be measured so as to create a visual fluid interface.

6. A fluid pressure gauge comprising:

a substantially cylindrical chamber having a central axis;

transparent material forming and end face of said end face coaxial with said chamber, said concentric circles being calibrated in pressure units, input means for supplying a first fluid rotational at a constant flow rate and pressure to said chamber whereby said first fluid occupies an annular portion of said chamber, an annular exit means for discharging said first fluid from said chamber; and central passage means for supplying to said chamber a second fluid whose pressure is to be measured so as to create a visual fluid interface.

7. A fluid pressure gauge comprising:

a substantially cylindrical chamber having a central axis;

transparent material forming an end face of said chamber, a series of concentric circles located on said end face coaxial with said chamber, said concentric circles being calibrated in pressure units, input means for supplying a first fluid rotationally to said chamber whereby said first fluid occupies an annular portion of said chamber, annular exit means for discharging said first fluid from said chamber at a constant pressure; and central passage means for supplying to said chamber a second fluid at a constant pressure so as to create a visual fluid interface.

8. A fluid pressure gauge comprising:

a substantially cylindrical chamber having a central axis;

transparent material forming an end face of said chamber, input means for supplying a first fluid rotationally to said chamber whereby said first fluid occupies an annular portion of said chamber, annular exit means for discharging said first fluid from said chamber at a constant pressure; and central passage means for suplying to said chamber a second fluid at a constant pressure so as to create a visual fluid interface.

References Cited

UNITED STATES PATENTS

| | | | |
|---|---|---|---|
| 3,320,815 | 5/1967 | Bowles. | |
| 2,616,563 | 11/1952 | Hebb | 55—459 X |
| 3,336,931 | 8/1967 | Fox et al. | 137—81.5 |
| 3,198,214 | 8/1965 | Lorenz | 137—81.5 X |
| 3,219,048 | 11/1965 | Palmisano | 137—81.5 |
| 3,270,561 | 9/1966 | Smith | 73—388 |
| 3,324,891 | 6/1967 | Rhoades | 137—81.5 |

OTHER REFERENCES

Pengelley, "Flow in a Viscous Vortex," Journal of Applied Physics, vol. 28, No. 1, January 1957, pp. 86–92. (Copy in 73/194 vor.)

CHARLES A. RUEHL, Primary Examiner

U.S. Cl. X.R.

137—81.5